United States Patent
Nishikawa et al.

(10) Patent No.: US 10,136,080 B2
(45) Date of Patent: Nov. 20, 2018

(54) IMAGE GENERATING APPARATUS

(71) Applicant: DENSO CORPORATION, Kariya, Aichi-pref. (JP)

(72) Inventors: Masato Nishikawa, Kariya (JP); Kazuyoshi Akiba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/804,782

(22) Filed: Nov. 6, 2017

(65) Prior Publication Data

US 2018/0131884 A1 May 10, 2018

(30) Foreign Application Priority Data

Nov. 7, 2016 (JP) .................. 2016-217320

(51) Int. Cl.
*H04N 5/355* (2011.01)
*B60R 1/00* (2006.01)
*H04N 5/232* (2006.01)
*H04N 5/235* (2006.01)

(52) U.S. Cl.
CPC ......... *H04N 5/35581* (2013.01); *B60R 1/00* (2013.01); *H04N 5/2353* (2013.01); *H04N 5/23229* (2013.01); *B60R 2300/303* (2013.01)

(58) Field of Classification Search
CPC ............................... H04N 5/35581
USPC ...................................... 348/239
See application file for complete search history.

(56) References Cited

U.S. PATENT DOCUMENTS

2006/0033823 A1* 2/2006 Okamura ............... H04N 5/235
 348/254
2015/0341537 A1* 11/2015 Peng .................... H04N 5/2351
 348/234

FOREIGN PATENT DOCUMENTS

| JP | 2009-071706 A | 4/2009 |
| JP | 2011-250194 A | 12/2011 |
| JP | 2016-096417 A | 5/2016 |

* cited by examiner

*Primary Examiner* — Joel W Fosselman
(74) *Attorney, Agent, or Firm* — Knobbe, Martens, Olson & Bear, LLP

(57) ABSTRACT

In an image generating apparatus, an image combining unit combines, for each of first and second processes in sequence, first and second images to generate a composite image having a digital pixel value representing a luminance level of the corresponding pixel by a first bit width. A range setter sets, for each of the first and second processes, a target luminance-level distribution range of at least one target with respect to the composite image; the distribution range represents a range within which luminance levels of the at least one target are distributed. A dynamic range adjuster adjusts a dynamic range of the composite image generated for one of the first and second processes such that the dynamic range of the composite image generated for the corresponding one of the first and second processes matches with the target luminance-level distribution range set for the first process.

7 Claims, 11 Drawing Sheets

IMAGE GENERATING APPARATUS

CROSS REFERENCE TO RELATED APPLICATION

This application is based on and claims the benefit of priority from Japanese Patent Application No. 2016-217320 filed on Nov. 7, 2016, the disclosure of which is incorporated in its entirety herein by reference.

TECHNICAL FIELD

The present disclosure relates to image generating apparatuses for combining plural images to thereby generate a composite image with a higher dynamic range; the plural images are captured during respective different shutter times, i.e. exposure times, or captured at respective different shutter speeds.

BACKGROUND

High dynamic range functions (HDR functions) combine a first image captured during a first shutter time with a second image captured during a second shutter time, which is longer than the first shutter time, to thereby generate a composite image having a higher dynamic range from a low luminance level to a high luminance level.

In-vehicle cameras incorporate therein such a HDR function, and use the HDR function to increase the accuracy of detecting objects, such as white lines on roads and/or other vehicles. An in-vehicle camera captures images while its luminous environment changes when the corresponding vehicle is travelling. This change in luminous environment around the in-vehicle camera changes the tone of an image captured by the in-vehicle camera. This tone change may reduce the accuracy of detecting objects, such as white lines.

For addressing such a problem, Japanese Patent Application Publication No. 2016-96417 discloses a camera system installed in a vehicle. The camera system obtains information about luminous environment around the vehicle; the luminous environment changes while the vehicle is travelling. For example, the luminous environment information includes information about a daytime luminous environment and information about a nighttime luminous environment.

The camera system captures a first image during a first shutter time, and captures a second image during a second shutter time, which is longer than the first shutter time. Then, the camera system selects one of an automatic white-balance correcting task and a custom white-balance correcting task in accordance with the luminous environment to apply the selected one of the automatic white-balance correcting task and custom white-balance correcting task to each of the first image and the second image. Thereafter, the camera system combines the first image with the second image, thus generating a composite image having a higher dynamic range.

SUMMARY

The change in luminous environment around a camera changes, in addition to the tone of an image captured by the camera, the luminance distribution of objects to be captured. A value of each pixel, i.e. a pixel value of each pixel, of an image captured by an image sensor represents a luminance level of the corresponding pixel of the image restricted by a limited bit width, i.e. a limited number of bits. For this reason, even if the image captured by the camera is subjected to only one of the white-balance correcting task and custom white-balance correcting task, it may be difficult to efficiently use the limited number of bits to express a luminance level of each pixel of the composite image.

This may result in, in the composite image, at least one of

1. The occurrence of blocked-up shadows or crushed shadows
2. The occurrence of blown-out highlights or clipped whites
3. The occurrence of allocation of pixel values to unused luminance levels corresponding to no targets to be imaged The occurrence of allocation of pixel values to unused luminance levels may result in coarse gray-scale of the composite image.

In view of the circumstances set forth above, one aspect of the present disclosure seeks to provide image generating apparatuses, which are capable of addressing the problems set forth above.

Specifically, an alternative aspect of the present disclosure aims to provide such image generating apparatuses, each of which is capable of efficiently using a limited number of bits to express a luminance level of each pixel of a composite image, the composite image being based on a first image and a second image captured during respective first and second shutter times different from each other.

According to an exemplary aspect of the present disclosure, there is provided an image generating apparatus. The image generating apparatus includes a controller configured to cause, based on control parameters for a camera, the camera to capture a first image based on a first shutter time and a second image based on a second shutter time for each of first and second processes in sequence. The first and second images each include at least one target to be imaged. The first shutter time is longer than the second shutter time, and the control parameters include the first shutter time and the second shutter time. The image generating apparatus includes an image combining unit configured to combine, for each of the first and second processes, the first image and the second image to thereby generate a composite image having a digital pixel value of each pixel thereof. The digital pixel value of each pixel represents a luminance level of the corresponding pixel by a first bit width. The image generating apparatus includes a range setter configured to set, for each of the first and second processes, a target luminance-level distribution range of the at least one target with respect to the composite image. The target luminance-level distribution range represents a range within which luminance levels of the at least one target are distributed. The image generating apparatus includes a compression characteristic generator configured to generate, for each of the first and second processes, a compression characteristic for compressing the digital pixel value of each pixel of the composite image by a second bit width. The second bit width is smaller than the first bit width. The image generating apparatus includes a compression unit configured to compress, in accordance with the compression characteristic, the composite image for each of the first and second processes to thereby generate a compressed composite image. The image generating apparatus includes a dynamic range adjuster configured to adjust a dynamic range of the composite image generated for one of the first and second processes such that the dynamic range of the composite image generated for the corresponding one of the first and second processes matches with the target luminance-level distribution range set by the range setter for the first process.

The dynamic range adjuster of the exemplary aspect of the present disclosure adjusts the dynamic range of the composite image generated for one of the first and second processes such that the dynamic range of the composite image generated for the corresponding one of the first and second processes matches with the target luminance-level distribution range set by the range setter for the first process.

This enables the dynamic range of the composite image to match with the target luminance-level distribution range set by the range setter; the luminance levels of the at least one target are distributed within the target luminance-level distribution range.

This therefore prevents digital pixel values, each of which is limited by the second bit width, i.e. the limited number of bits, from being allocated for unused luminance levels located outside the target luminance-level distribution range. This makes it possible to efficiently use the limited number of bits to express a corresponding luminance level of each pixel of the composite image.

The above and/or other features, and/or advantages of various aspects of the present disclosure will be further appreciated in view of the following description in conjunction with the accompanying drawings.

Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
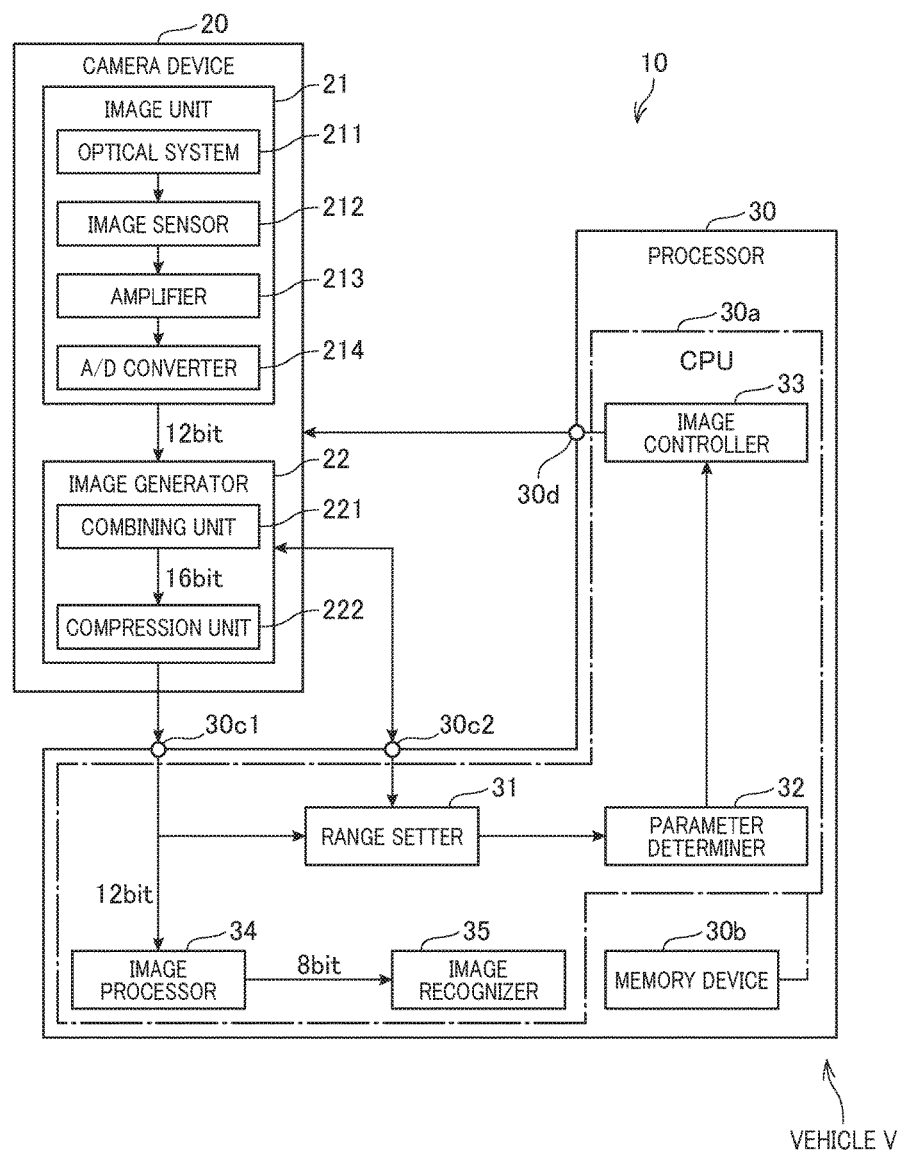
FIG. 1 is a block diagram schematically illustrating an example of the structure of an image generating apparatus according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description.

First Embodiment

The following describes an image generating apparatus 10 according to the first embodiment of the present disclosure with reference to FIGS. 1 to 10.

Referring to FIG. 1, the image generating apparatus 10, which is installed in a vehicle V, includes a camera device 20 and a processor 30.

The camera device 20 includes an imaging unit 21 and an image generator 22. The camera device 20 is, for example, mounted to a predetermined position of the front windshield of the vehicle V. The predetermined position is determined to be capable of capturing a predetermined region, which includes a road surface on which the vehicle V is going to travel, in front of the vehicle V. In particular, the predetermined position is located at the back side of the rearview mirror of the vehicle V such that the rearview mirror enables a driver of the vehicle V not to see the camera device 20.

The imaging unit 21 includes an optical system 211, an image sensor 212, an amplifier 213, and an analog-to-digital (A/D) converter 214. The optical system 211 is comprised of at least one lens to direct light to the image sensor 212.

The image sensor 212 is comprised of light-sensitive elements each including a charge-coupled device (CCD) or a complementary metal-oxide-semiconductor (CMOS) switch; the light-sensitive elements are arranged in a two-dimensional array to constitute an imaging surface on which the directed light is formed as an image. The two-dimensionally arranged light-sensitive elements constitute an imaging area on which light output from the optical system 211 is received.

Each of the light-sensitive elements is sensitive to an amount or a level of light; the level of light is equal to or more than a predetermined noise level and is equal to or less than a predetermined saturation level.

Specifically, each of the two-dimensionally arranged light-sensitive elements, which serve as pixels, is configured to receive a component of light directed from the optical system 211 during a shutter time ST or an exposure time. Each of the two-dimensionally arranged light-sensitive elements is also configured to convert the intensity or luminance level of the received light component into an analog pixel value or an analog pixel signal that is proportional to the luminance level of the received light component.

The shutter time ST during which light is received by the two-dimensionally arranged light-sensitive elements, in other words, during which the two-dimensionally arranged light-sensitive elements are exposed to light, is a control parameter controllable by, for example, the processor 30 described later. That is, the processor 30 is capable of controlling the shutter time ST of the image sensor 212.

The shutter time ST can also be expressed as a shutter speed of the image sensor 212. That is, the higher the shutter speed is, the shorter the shutter time ST is.

In particular, the image sensor 212 periodically captures first and second images during respective first and second different shutter times ST1 and ST2; these shutter times ST1 and ST2 are control parameters set by the processor 30. Note that the first shutter time ST1 is set to be longer than the second shutter time ST2. That is, the first image can be called a long shutter-time image, and the second image can be called a short shutter-time image.

The amplifier 213 receives each of the first and second images. Then, the amplifier 213 amplifies the analog pixel values of each of the first and second images by an analog gain variably controllable by the processor 30 described later. That is, the processor 30 is capable of controlling the analog gain of the amplifier 213.

The A/D converter 214 converts the analog pixel signals (analog pixel values) of each of the first and second images amplified by the amplifier 213 into digital pixel signals (digital pixel values) based on a predetermined bit width, i.e. the number of bits. The bit width according to the first embodiment is set to 12 bits.

The image generator 22 is designed as, for example, a hardware circuit comprised of an image signal processor. The image generator 22 includes, for example, a combining unit 221 and a compression unit 222.

The combining unit 221 obtains the digitized first and second images from the imaging unit 21, and combines the digitized first and second images with each other to generate a composite image, which will be referred to as an HDR composite image, with higher dynamic range. Dynamic range of an image represents a range of contrast of the image. The dynamic range of an image captured by the image sensor 212 during a shutter time is determined depending on the sensitivity of the light-sensitive elements of the image sensor 212. In addition, the dynamic range of an image captured by the image sensor 212 is determined depending on the length of the shutter time.

For example, the combining unit 221 generates a HDR composite image having a digital pixel value of each pixel representing a luminance level of the corresponding pixel; the bit width of the digital pixel value of each pixel of the HDR composite image is set to 16 bits, i.e. greater than the bit width of 12 bits of each of the first and second images.

The compression unit 222 compresses the HDR composite image having a digital pixel value of each pixel represented by the first bit width of 16 bits to thereby generate a compressed HDR composite image having a digital pixel value of each pixel represented by a second bit width of 12 bits. The second bit width can be set to another bit width as long as the second bit width is shorter than the first bit width. The compression unit 222 outputs, to the processor 30, the compressed HDR composite image having a digital pixel value of each pixel represented by the second bit width of 12 bits.

That is, the imaging unit 21 is configured to periodically generate compressed HDR composite image, and periodically output the compressed HDR image to the processor 30.

The processor 30 is configured mainly as at least one known microcomputer including a CPU 30a, a memory device 30b, input ports 30c1 and 30c2, and an output port 30d. The memory device 30b includes, for example, at least one of semiconductor memories, such as a RAM, a ROM, and a flash memory. These semiconductor memories are for example non-transitory storage media.

Each of the input ports 30c1 and 30c2 is communicable with the camera device 20 by wire or wireless. The output port 30d is communicable with the camera device 20 by wire or wireless.

For example, the CPU 30a of the processor 30 can run one or more programs, i.e. sets of program instructions, stored in the memory device 30b, thus implementing various functional modules of the processor 30 as software operations. In other words, the CPU 30a can run programs stored in the memory device 30b, thus performing one or more routines in accordance with the corresponding one or more programs. The above routines and/or various functions of the processor 30 can be implemented as a hardware electronic circuit. For example, the various functions of the processor 30 can be implemented by a combination of electronic circuits including digital circuits, which include many logic gates, analog circuits, digital/analog hybrid circuits, or hardware/software hybrid circuits.

Plural microcomputers can constitute the processor 30.

The functional modules implemented by the CPU 30a include a range setter 31, a parameter determiner 32, an imaging controller 33, an image processor 34, and an image recognizer 35.

The range setter 31 receives the HDR composite image output from the image generator 22 at a current period via the input port 30c2. Then, the range setter 31 sets a target luminance-level distribution range of luminance levels for the HDR composite image in accordance with at least one target to be recognized from the HDR composite image; the at least one target to be recognized will be referred to as least one recognition target.

The parameter determiner 32 determines, as values of the control parameters, a value of the first shutter time ST1, a value of the second shutter time ST2, and a value of the analog gain in accordance with the target luminance-level distribution range of luminance levels for the compressed HDR composite image.

The imaging controller 33, which serves as, for example, a dynamic range adjuster, controls the imaging unit 21 in accordance with the determined values of the control parameters, i.e. the first shutter time ST1, the second shutter time ST2, and the analog gain, thus capturing a next first image and a next second image at a next period.

The image processor 34 discards the predetermined lowest-order bits from the 12-bit digital pixel value of each pixel of the compressed HDR composite image output from the imaging unit 21. For example, the image processor 34 discards the lowest-order four bits from the 12-bit digital pixel value of each pixel of the compressed HDR composite image, thus outputting an output image having a 8-bit digital pixel value of each pixel to the image recognizer 35.

The image recognizer 35 is configured to be capable of handling data having 8 bits or less, and to recognize, from the output image, at least one recognition target. Then, the image recognizer 35 is configured to output the recognition result to the ECU 100.

Figure 2:
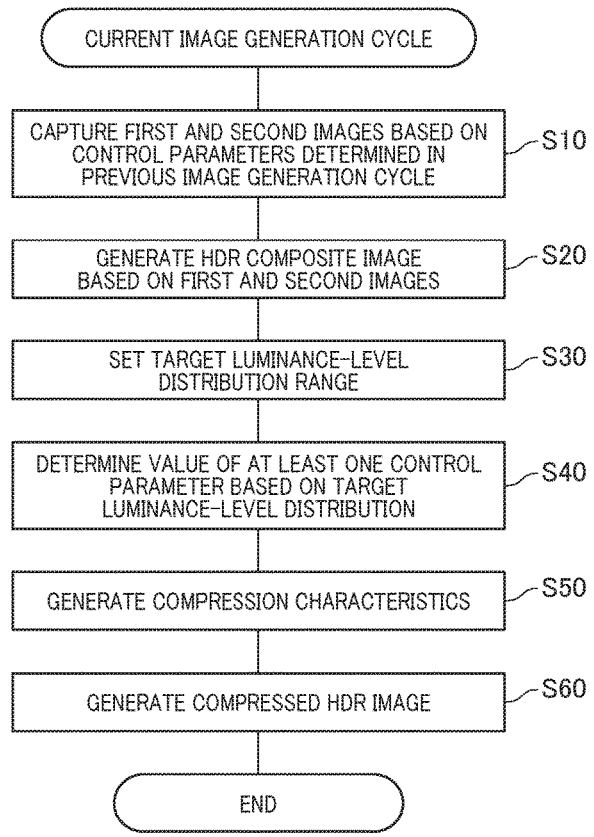
FIG. 2 is a flowchart schematically illustrating an example of an image generation cycle carried out by the image generating apparatus illustrated in FIG. 1.

Next, the following describes an image generation cycle, i.e. an image generation process, carried out by the image generating apparatus 10 with reference to FIG. 2. That is, the image generating apparatus 10 periodically performs the image generation cycle in predetermined intervals.

In step S10 of a current image generation cycle, the imaging controller 33 controls the imaging unit 21 using the control parameters to cause the imaging unit 21 to capture first and second images during respective first and second different shutter times ST1 and ST2. The control parameters used in the current image generation cycle have been determined by the parameter determiner 32 in step S40 of the previous image generation cycle. The second shutter time ST2 according to the first embodiment is set to 1.25 [ms], and the first shutter time ST1 according to the first embodiment is set to 20 [ms].

In step S10, the imaging unit 21 amplifies each of the first and second images by the analog gain, and converts the analog pixel signals (analog pixel values) of each of the amplified first and second images into digital pixel signals (digital pixel values) based on the predetermined bit width of 12 bits.

Next, the image generator 22 obtains the digitized first and second images sent from the imaging unit 21, and combines the digitized first and second images with each other to generate an HDR composite image in step S20.

Figure 3:
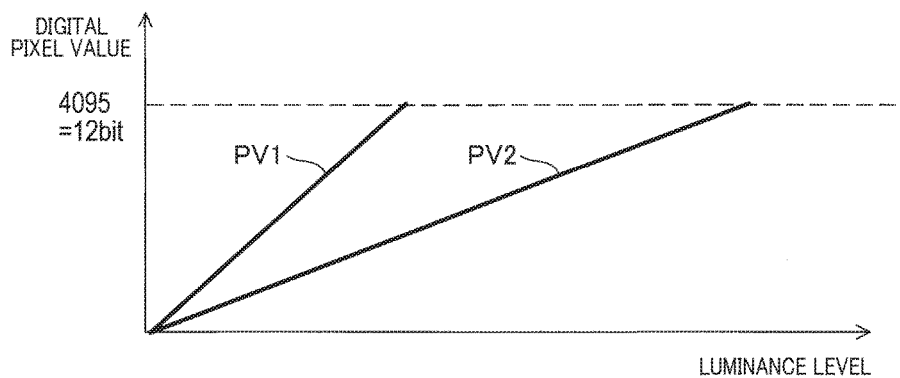
FIG. 3 is a graph schematically illustrating first pixel-value characteristics relative to luminance levels of a first image, and second pixel-value characteristics relative to luminance levels of a second image according to the first embodiment.
Figure 4:
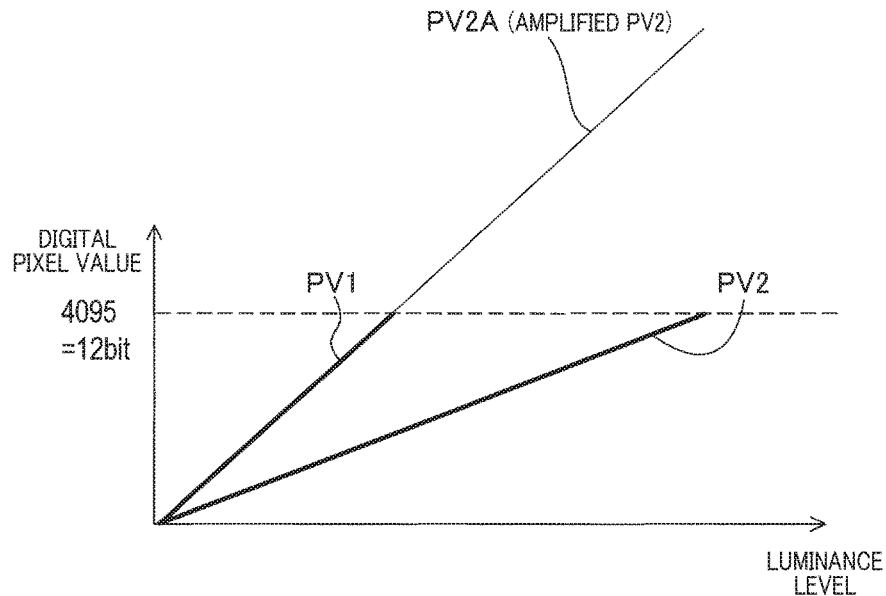
FIG. 4 is a graph schematically illustrating the first pixel-value characteristics relative to the luminance levels of the first image, and amplified second pixel-value characteristics relative to the luminance levels of the second image according to the first embodiment.

FIG. 3 illustrates a graph representing first pixel-value characteristics PV1 relative to luminance levels of the first image, and second pixel-value characteristics PV2 relative to luminance levels of the second image. The graph has a vertical axis indicative of the digital pixel values of each of the first and second images, and a horizontal axis indicative of the corresponding luminance levels of the corresponding one of the first and second images. Because the shutter time ST1 is set to be 16 times as long as the shutter time ST2, the amount of light received by the imaging area of the image sensor 212 for the first image is 16 times larger than the amount of light received by the imaging area of the image sensor 212 for the second image. For this reason, each of the digital pixel values of the first image of a target is 16 times larger than the corresponding digital pixel value of the second image of the same target although the luminance level of the target are unchanged.

For this reason, in step S20, the image generator 22 obtains the ratio of the first shutter time ST1 to the second shutter time ST2, and amplifies the digital pixel values of the second image by the obtained ratio as a digital gain to thereby match the second pixel-value characteristics PV2 with the first pixel-value characteristics PV1. The amplified second pixel-value characteristics PV2 are illustrated by reference character PV2A in FIG. 4. That is, this enables the digital pixel value of each pixel of the second image and the digital pixel value of the corresponding pixel of the first image to represent the same luminance level.

Specifically, the ratio of the first shutter time ST1 to the second shutter time ST2 is 16, so that the image generator 22 multiplies the digital pixel values of the second image by 16. This results in the luminance level of each pixel of the second image being represented as the first bit width, i.e., 16-bit width. That is, the digital pixel value of each pixel of the second image is within the range from 00000 to 65535.

For example, the image generator 22 is configured to
1. Select one of the digital pixel value of the corresponding pixel of the first image and the digital pixel value of the corresponding pixel of the second image or
2. Merge two of the digital pixel value of each pixel of the first image and the digital pixel value of the corresponding pixel of the second image In particular, the image generator 22 is configured to, for example, select the digital pixel values of the first image, i.e. the long shutter-time image, for a lower luminance-level region of the composite image, and select the digital pixel values of the second image, i.e. the short shutter-time image, for a higher luminance-level region of the composite image.

Figure 5:
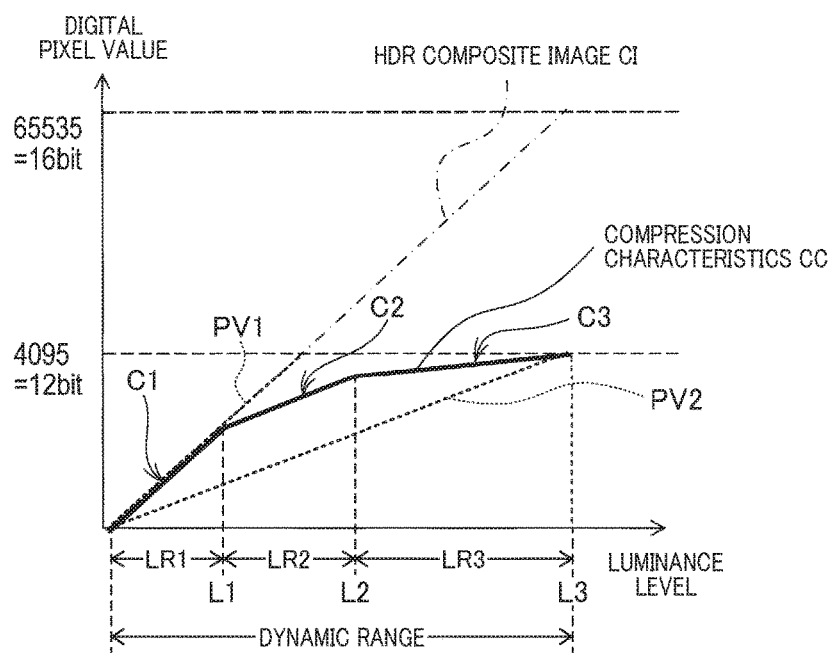
FIG. 5 is a graph schematically illustrating an example of an HDR composite image generated based on combination of the first image and the second image, and compression characteristics generated by an image generator illustrated in FIG. 1.

FIG. 5 illustrates an example of the HDR composite image generated based on combination of the first image and the second image using the reference character CI; the digital pixel value of each pixel of the HDR composite image CI is expressed by the first bit width, i.e., 16-bit width.

Next, in step S30, the range setter 31 sets a target luminance-level distribution range of at least one recognition target with respect to the HDR composite image generated in step S20.

Figure 6:
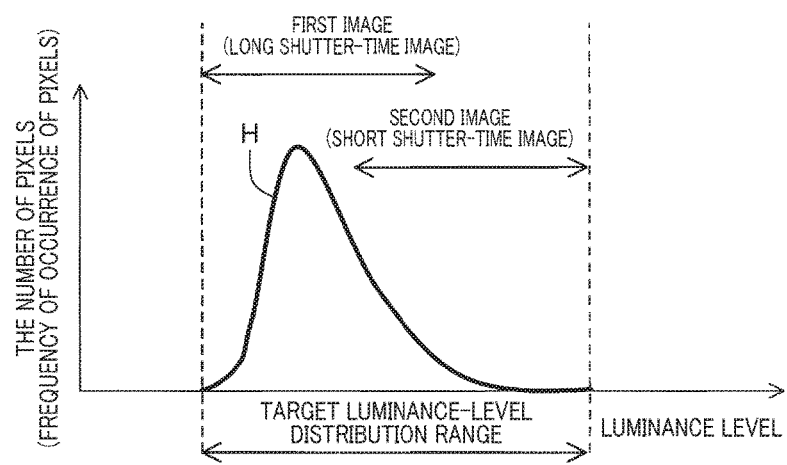
FIG. 6 is a graph schematically illustrating an example of a histogram of the luminance levels of the HDR composite image based on the first image and the second image according to the first embodiment.

FIG. 6 illustrates an example of a histogram H of the luminance levels of the HDR composite image based on the first image (long shutter-time image) and the second image (short shutter-time image) as a graph whose horizontal axis represents the luminance levels of the HDR composite image, and whose vertical axis represents the number of pixels corresponding to each luminance level of the HDR composite image. In other words, the vertical axis of the graph represents the frequency of occurrence of pixels corresponding to each luminance level of the first and second images.

As illustrated in FIG. 6, the luminance levels of the first image (long shutter-time image) are distributed in a relatively lower region in the histogram H, and the luminance levels of the second image (short shutter-time image) are distributed in a relatively higher region in the histogram H. In step S30, the target luminance-level distribution range is defined as a luminance-level distribution range of the histogram H from a variable lower limit level LL to a variable upper limit level UL.

Specifically, in step S30, the range setter 31 sets a value of the upper limit level UL such that the number of pixels of luminance levels of the HDR composite image, which are higher than the upper limit level UL, is smaller than a predetermined high-contrast threshold. Additionally, in step S30, the range setter 31 sets a value of the lower limit level LL such that the number of pixels of luminance levels of the HDR composite image, which are lower than the lower limit level LL, is smaller than a predetermined low-contrast threshold.

The high-contrast threshold is previously determined to be a value that prevents the occurrence of blown-out highlights or clipped whites of an estimated higher luminance-level object, and the low-contrast threshold is previously determined to be a value that prevents the occurrence of blocked-up shadows or crushed shadows of an estimated lower luminance-level object.

In step S30, if there are two separated histograms of some luminance levels of the HDR composite image and one of the two separated histograms is located to be higher than a predetermined upper limit threshold, the range setter 31 eliminates the separated histogram, which is located to be higher than the predetermined upper limit threshold, from the luminance levels of the HDR composite image, thus setting the target luminance-level distribution range about the remaining separated histogram, i.e. the remaining distribution of the luminance levels. The upper limit threshold is previously determined to be a luminance level; the luminance level is located outside a predetermined luminance level range that recognition targets, such as pedestrians and other vehicles, to be captured by the camera device 20 can have normally. In other words, objects having very high luminance levels higher than the upper limit threshold may be light sources, such as the sun or fluorescent lamps, so that they can be eliminated from recognition targets to be captured by the camera device 20.

Figure 7:
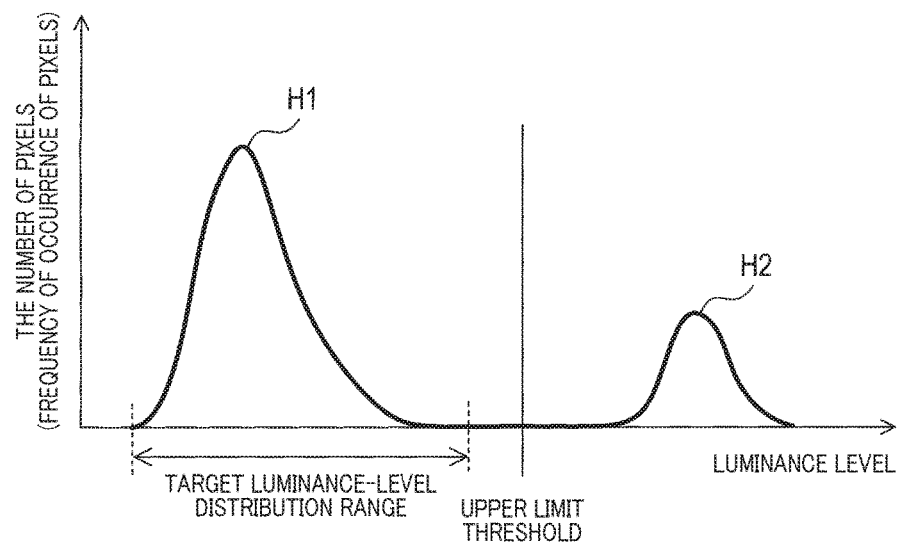
FIG. 7 is a graph schematically illustrating an example of a histogram of the luminance levels of the HDR composite image in which there are two separated distributions according to the first embodiment.

For example, if there are two separated distributions H1 and H2 of the luminance levels of the HDR composite image and the separated distribution H2 is located to be higher than the predetermined upper limit threshold, the range setter 31 eliminates the separated distribution H2, thus setting the target luminance-level distribution range about the remaining separated distribution H1 (see FIG. 7).

That is, the target luminance-level distribution range for the HDR composite image represents a target dynamic range for the HDR composite image.

Next, the parameter determiner 32 determines a value of at least one of the control parameters including the first shutter time ST1, the second shutter time ST2, and the analog gain in accordance with the target luminance-level distribution range in step S40.

Figure 8:
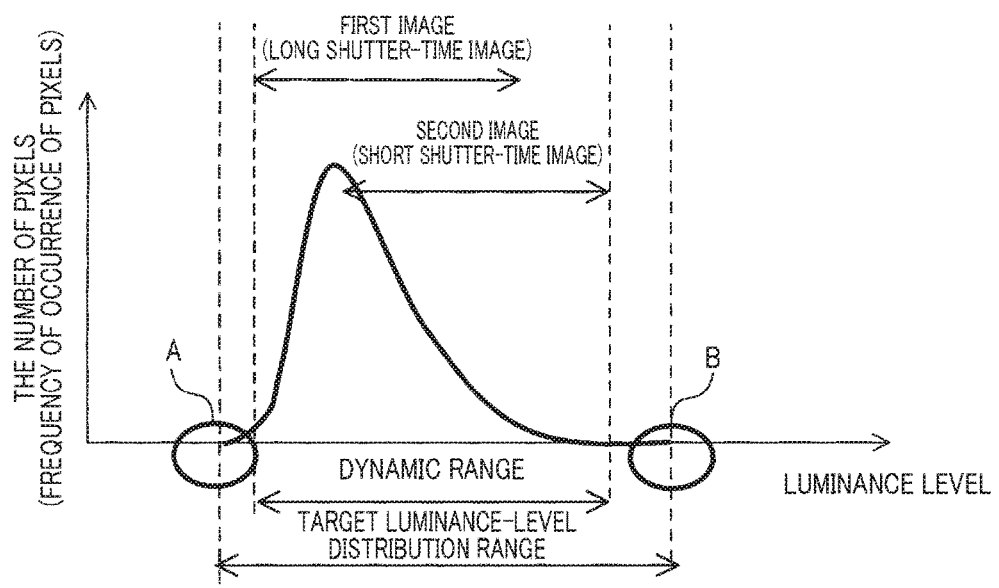
FIG. 8 is a graph schematically illustrating a relationship between a target luminance-level distribution range for the HDR composite image and a current dynamic range of the HDR composite image according to the first embodiment.

FIG. 8 schematically illustrates a relationship between the target luminance-level distribution range, i.e. a target dynamic range, for the HDR composite image and a current dynamic range of the HDR composite image. Specifically, FIG. 8 shows that the current dynamic range of the HDR composite image is insufficient to satisfy the target dynamic range.

In detail, as illustrated in a circled portion A in FIG. 8, the current dynamic range of the HDR composite image at its lowest luminance-level portion is insufficient to satisfy the target dynamic range at its lowest luminance-level portion. This may result in a corresponding portion of the at least one recognition target included in the HDR composite image becoming blocked-up shadows or crushed shadows. Additionally, as illustrated in a circled portion B in FIG. 8, the current dynamic range of the HDR composite image at its highest luminance-level portion is insufficient to satisfy the target dynamic range at its highest luminance-level portion. This may result in a corresponding portion of the at least one recognition target included in the HDR composite image being saturated, so that the corresponding portion of the at least one recognition target included in the HDR composite image may have blown-out highlights or clipped whites.

On the other hand, if the current dynamic range of the HDR composite image is wider than the target luminance-level distribution range, unused luminance levels corresponding to no recognition targets may be included in the HDR composite image.

For addressing such a situation, the parameter determiner 32 calculates a value of at least one of the control parameters including the first shutter time ST1, the second shutter time ST2, and the analog gain in step S40; the value of at least one of the control parameters is required to match the current dynamic range of the HDR composite image with the target dynamic range, i.e. the target luminance-level distribution range, set in step S30.

Specifically, the parameter determiner 32 determines a value of the first shutter time ST1 to be longer if the current dynamic range of the HDR composite image at its lowest luminance-level portion is insufficient to satisfy the target dynamic range at its lowest luminance-level portion. This enables a luminance level lower than the lowest luminance level of the current dynamic range to be set to 00001, thus extending the current dynamic range in the darker direction (luminance-level lower direction).

In addition, the parameter determiner 32 determines a value of the second shutter time ST2 to be shorter if the current dynamic range of the HDR composite image at its highest luminance-level portion is insufficient to satisfy the target dynamic range at its highest luminance-level portion. This enables a luminance level higher than the highest luminance level of the current dynamic range to be set to the maximum value based on the first bit width, i.e. 16-bit width; the maximum value is 65535.

If the lowest luminance level of the current dynamic range of the HDR composite image does not cover the lowest luminance level of the target dynamic range in spite of the fact that the first shutter time ST1 has reached its upper limit, the parameter determiner 32 determines, i.e. adjusts, a value of the analog gain to thereby extend the current dynamic range in the darker direction (luminance-level lower direction).

Note that the determined value of at least one of the control parameters is used for the image controller 33 in step S10 of the next current image generation cycle set forth above. That is, if no new values of the remaining control parameter(s) are determined in step S10, the values of the remaining control parameter(s), which have been used for the image controller 33 in step S10 of the current image generation cycle, are also used for the image controller 33 in step S10 of the next current image generation cycle.

Next, in step S50, the image generator 22 generates compression characteristics CC for compressing the HDR composite image generated in step S20.

Because the HDR composite image, which is generated based on combination of the first and second images having the respective different shutter times ST1 and ST2, has a digital pixel value of each pixel represented by the first bit width, i.e., 16-bit width. That is, the first bit width of the digital pixel value of each pixel of the HDR composite image is longer than the 8-bit width recognizable by the image recognizer 35.

For this reason, the image generator 22 is configured to compress the HDR composite image whose bit width of each pixel is changed from 16 bits to 8 bits.

First, the image generator 22 generates the compression characteristics CC that express the luminance levels of the HDR composite image within the current dynamic range or the target dynamic range by digital pixel values of 12-bit width.

An example of the compression characteristics generated by the image generator 22 is illustrated in FIG. 5 as a graph format.

Specifically, the compression characteristics CC illustrated in FIG. 5 have

1. A predetermined first compression rate C1 for the luminance level of a pixel of the HDR composite image being within a predetermined low luminance-level region LR1 that is defined to be lower than a predetermined first luminance level L1

2. A predetermined second compression rate C2 for the luminance level of a pixel of the HDR composite image being within a predetermined middle luminance-level region LR2 that is defined to be equal to or higher than the first luminance level L1 and lower than a predetermined second luminance level L2; the second compression rate C2 is higher than the first compression rate C1

3. A predetermined third compression rate C3 for the luminance level of a pixel of the HDR composite image being within a predetermined high luminance-level region LR3 that is defined to be equal to or higher than the second luminance level L2 and lower than a predetermined third luminance level L3 corresponding to the highest luminance level of the dynamic range; the third compression rate C3 is higher than the second compression rate C2

In other words, a compression rate of the compression characteristics is changed from the first compression rate C1 to the second compression rate C2 at the first luminance level L1, and also changed from the second compression rate C2 to the third compression rate C3 at the second luminance level L2.

The image generator 22 sets the first compression rate C1 of the compression characteristics CC to 1, i.e. sets no compression of the compression characteristics CC within the low luminance-level region LR1 if the at least one recognition target in the HDR composite image is a pedestrian during night-time, because the body trunk of the pedestrian during night-time, on which no headlight is likely to fall, has low luminance levels. In addition, the image generator 22 sets the second compression rate C2 of the compression characteristics CC within the middle luminance-level region LR2 to be higher than the first compression rate of 1.

In addition, the image generator 22 sets the third compression rate C3 within the high luminance-level region LR3 to be higher than the second compression rate C2, because the leg portion of the pedestrian during night-time, on which headlight is likely to fall, has high luminance levels.

In other words, the image generator 22 generates the compression characteristics CC such that (1) No compression is carried out for the digital pixel values of the HDR composite image within the low luminance-level region LR1 to thereby enable the HDR composite image to have the digital pixel values of the first image themselves within the low luminance-level region LR1

(2) High compression is carried out for the digital pixel values of the HDR composite image within each of the middle luminance-level region LR2 and the high luminance-level region LR3

(3) The wider the target luminance-level distribution range is, the higher the compression rate for the digital pixel values of the HDR composite image within the high luminance-level region LR3 is Subsequently, the image generator 22 compresses, based on the compression characteristics CC generated in step S50, the HDR composite image having a digital pixel value of each pixel represented by the first bit width of 16 bits to thereby generate a compressed HDR composite image having a digital pixel value of each pixel represented by the second bit width of 12 bits in step S60. Then, the image generator 22 sends the compressed HDR composite image to the image processor 34 in step S60.

The image processor 34 discards the lowest-order four bits from the 12-bit digital pixel value of each pixel of the compressed HDR composite image sent from the image generator 22, thus outputting an output image having a 8-bit digital pixel value of each pixel to the image recognizer 35. Thereafter, the image generating apparatus 10 terminates the current image generation cycle, and thereafter returns to step S10, thus performing the next image generation cycle.

Next, the following describes a first example indicative of how the image generating apparatus 10 operates to generate an HDR composite image, and a second example indicative of how the image generating apparatus 10 operates to generate an HDR composite image.

Figure 9:
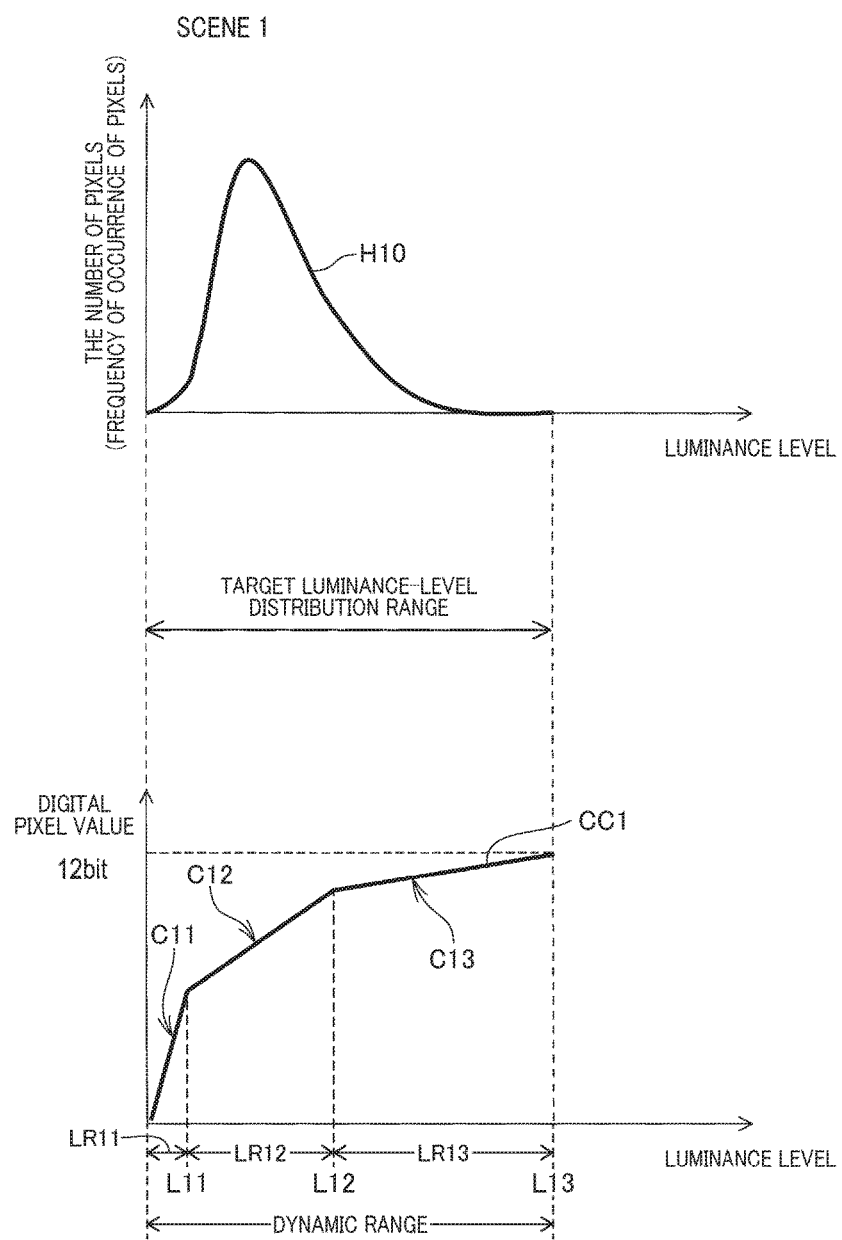
FIG. 9 is a graph schematically illustrating a histogram of the luminance levels of the first and second images of a first scene (scene 1), a target luminance-level distribution range determined based on the histogram, and compression characteristics determined based on the target luminance level distribution.
Figure 10:
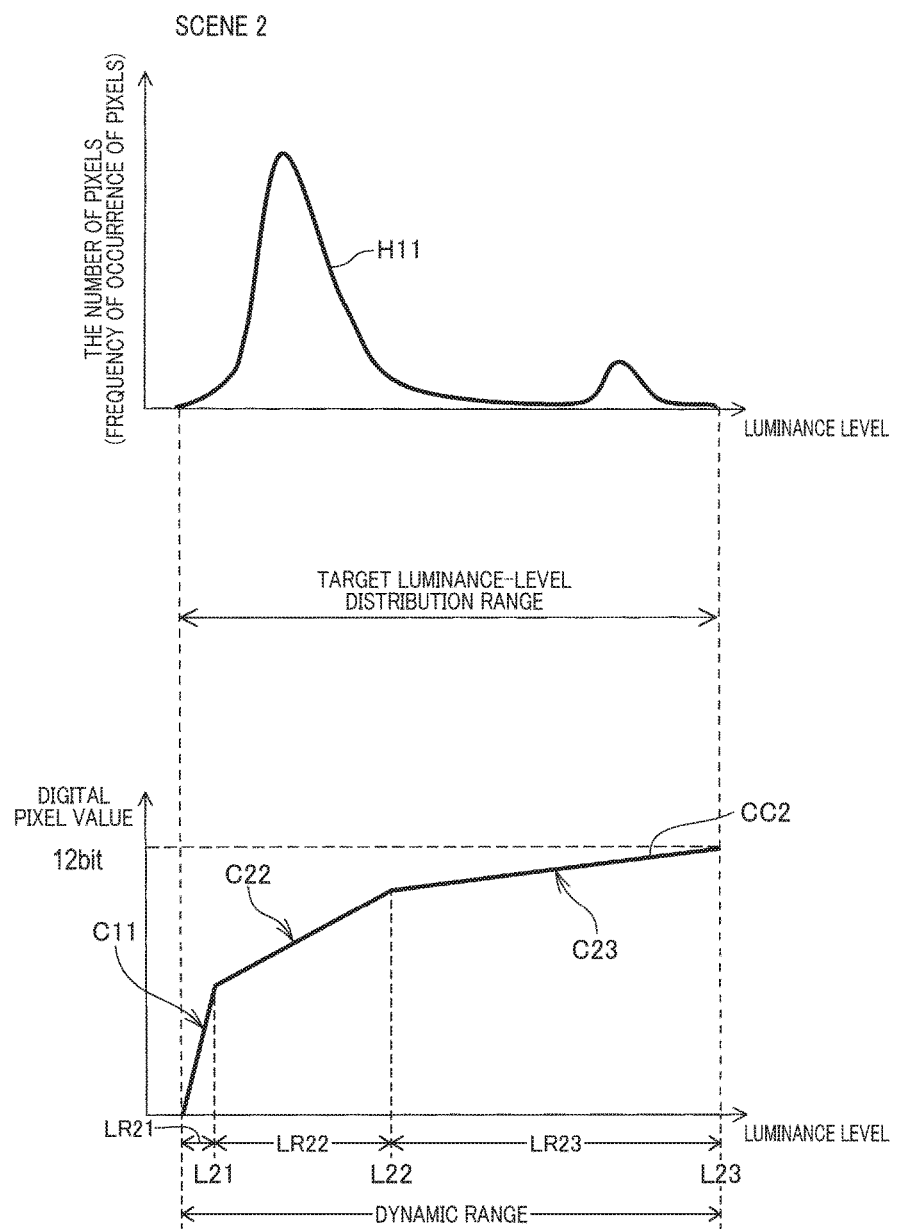
FIG. 10 is a graph schematically illustrating a histogram of the luminance levels of the first and second images of a second scene (scene 2), a target luminance-level distribution range determined based on the histogram, and compression characteristics determined based on the target luminance level distribution.

FIG. 9 schematically illustrates

1. A histogram H10 of the luminance levels of the first and second images, each of which is generated by capturing a first scene by the camera device 20 in an (m−1)-th image generation cycle where m is an integer more than 2

2. A target luminance-level distribution range set as a luminance-level distribution range of the histogram H10 in the (m−1)-th image generation cycle 3. Compression characteristics CC1 generated by the image generator 22 in the (m−1)-th image generation cycle according to the first example FIG. 10 also schematically illustrates 1. A histogram H11 of the luminance levels of the first and second images, each of which is generated by capturing a second scene by the camera device 20 in an (n−1)-th image generation cycle where n is an integer more than 2

2. A target luminance-level distribution range set as a luminance-level distribution range of the histogram H11 in the (n−1)-th image generation cycle 3. Compression characteristic CC2 generated by the image generator 22 in the (n−1)-th image generation cycle according to the second example.

For example, the first scene is a scene captured by the camera device 20 as the first and second images during daytime, and the second scene, which is different from the first scene, is a scene captured by the camera device 20 when the vehicle V is travelling at the exit of a tunnel.

FIG. 9 shows that the target luminance-level distribution range is set in accordance with the histogram H10, and a value of at least one of the control parameters is determined such that the dynamic range of the HDR composite image in the (m−1)-th image generation cycle matches with the target luminance-level distribution range.

Thereafter, first and second images are captured in the next m-th image generation cycle in accordance with the determined value of the at least one of the control parameters, so that an HDR composite image is generated based on the first and second images in the m-th image generation cycle. The dynamic range of the HDR composite image generated in the m-th image generation cycle is substantially matched with the target luminance-level distribution range set in the (m−1)-th image generation cycle.

Allocating digital pixel values of 12-bit width to the respective luminance levels of the HDR composite image within the dynamic range of the HDR composite image, i.e. within the target luminance-level distribution range of at least one recognition target in the HDR composite image, so that a compressed HDR composite image is generated.

The compression characteristics CC1 of the HDR composite image for the scene 1 have 1. A predetermined first compression rate C11 for the luminance level of a pixel of the HDR composite image being within a predetermined low luminance-level region LR11 that is defined to be lower than a predetermined first luminance level L11

2. A predetermined second compression rate C12 for the luminance level of a pixel of the HDR composite image being within a predetermined middle luminance-level region LR12 that is defined to be equal to or higher than the first luminance level L11 and lower than a predetermined second luminance level L12; the second compression rate C12 is higher than the first compression rate C11

3. A predetermined third compression rate C13 for the luminance level of a pixel of the HDR composite image being within a predetermined high luminance-level region LR13 that is defined to be equal to or higher than the second luminance level L12 and lower than a predetermined third luminance level L13 corresponding to the highest luminance level of the dynamic range; the third compression rate C13 is higher than the second compression rate C12

Similarly, the compression characteristics CC2 of the HDR composite image for the scene 2 have 1. A predetermined first compression rate C21 for the luminance level of a pixel of the HDR composite image being within a predetermined low luminance-level region LR21 that is defined to be lower than a predetermined first luminance level L21

2. A predetermined second compression rate C22 for the luminance level of a pixel of the HDR composite image being within a predetermined middle luminance-level region LR22 that is defined to be equal to or higher than the first luminance level L21 and lower than a predetermined second luminance level L22; the second compression rate C22 is higher than the first compression rate C21

3. A predetermined third compression rate C23 for the luminance level of a pixel of the HDR composite image being within a predetermined high luminance-level region LR23 that is defined to be equal to or higher than the second luminance level L22 and lower than a predetermined third luminance level L23 corresponding to the highest luminance level of the dynamic range; the third compression rate C23 is higher than the second compression rate C22

That is, the dynamic range of the HDR composite image for the first scene is wider than the dynamic range of the HDR composite image for the second scene.

For this reason, the first compression rate C11 for the luminance level of a pixel of the HDR composite image being within the low luminance-level region LR11 is identical to the second compression rate C21 for the luminance level of a pixel of the HDR composite image being within the low luminance-level region LR21. In contrast, the third compression rate C13 for the luminance level of a pixel of the HDR composite image being within the high luminance-level region LR21 is higher than the third compression rate C23 for the luminance level of a pixel of the HDR composite image being within the high luminance-level region LR23.

As described above, the image generation apparatus 10 is configured to set all the luminance levels of the HDR composite image within the target luminance-level distribution range to respective digital pixel values. This configuration therefore reduces allocation of digital pixel values to luminance levels of the HDR composite image; the luminance levels correspond to no recognition targets in the HDR composite image. This configuration also ensure that digital pixel values are allocated to the luminance levels of at least one recognition target in the HDR composite image.

The above first embodiment of the present disclosure achieves the following first to fifth advantageous effects.

The image generating apparatus 10 according to the first embodiment is configured to determine a value of at least one of the control parameters that control the imaging unit 21 to thereby generate an HDR composite image whose dynamic range matches with the target luminance-level distribution range within which the luminance levels of at least one recognition target included in the HDR composite image are distributed. The image generating apparatus 10 is also configured to allocate limited digital pixel values restricted by a predetermined bit width to the dynamic range of the generated HDR composite image.

This configuration achieves the first advantageous effect of reducing allocation of digital pixel values to luminance levels of the HDR composite image; the luminance levels correspond to no recognition targets in the HDR composite image. This therefore enables digital pixel values to be allocated to the luminance levels of at least one recognition target in the HDR composite image.

The image generating apparatus 10 according to the first embodiment is configured to capture first and second images based on the determined control parameters to thereby match the dynamic range of an HDR composite image generated based on the first and second images with the target luminance-level distribution range. This configuration achieves the second advantageous effect of generating a clearer output image based on the HDR composite image to the image recognizer 35 as compared with an output image, which is obtained by manipulating an HDR composite image to thereby match the dynamic range of the HDR composite image with the target luminance-level distribution range. This configuration also reduces processing load of the image generating apparatus 10.

The image generating apparatus 10 is configured to set the target luminance-level distribution range such that the number of pixels of luminance levels, which are higher than the upper limit level UL, is smaller than the predetermined high-contrast threshold. This configuration therefore achieves the third advantageous effect of preventing the occurrence of blocked-up shadows or crushed shadow of at least one recognition target.

The image generating apparatus 10 is configured to set the target luminance-level distribution range such that the number of pixels of luminance levels, which are lower than the lower limit level LL, is smaller than the predetermined low-contrast threshold. This configuration achieves the fourth advantageous effect of preventing the occurrence of blown-out highlights or clipped whites of at least one recognition target.

The image generating apparatus 10 is configured to set the target luminance-level distribution range while eliminating luminance-level distributions that are higher than the upper limit threshold. This configuration achieves the fifth advantageous effect of eliminating objects, which are clearly different from at least one recognition target, from the target luminance-level distribution range, thus allocating digital pixel values to the luminance levels of at least one recognition target in the HDR composite image.

Second Embodiment

Figure 11:
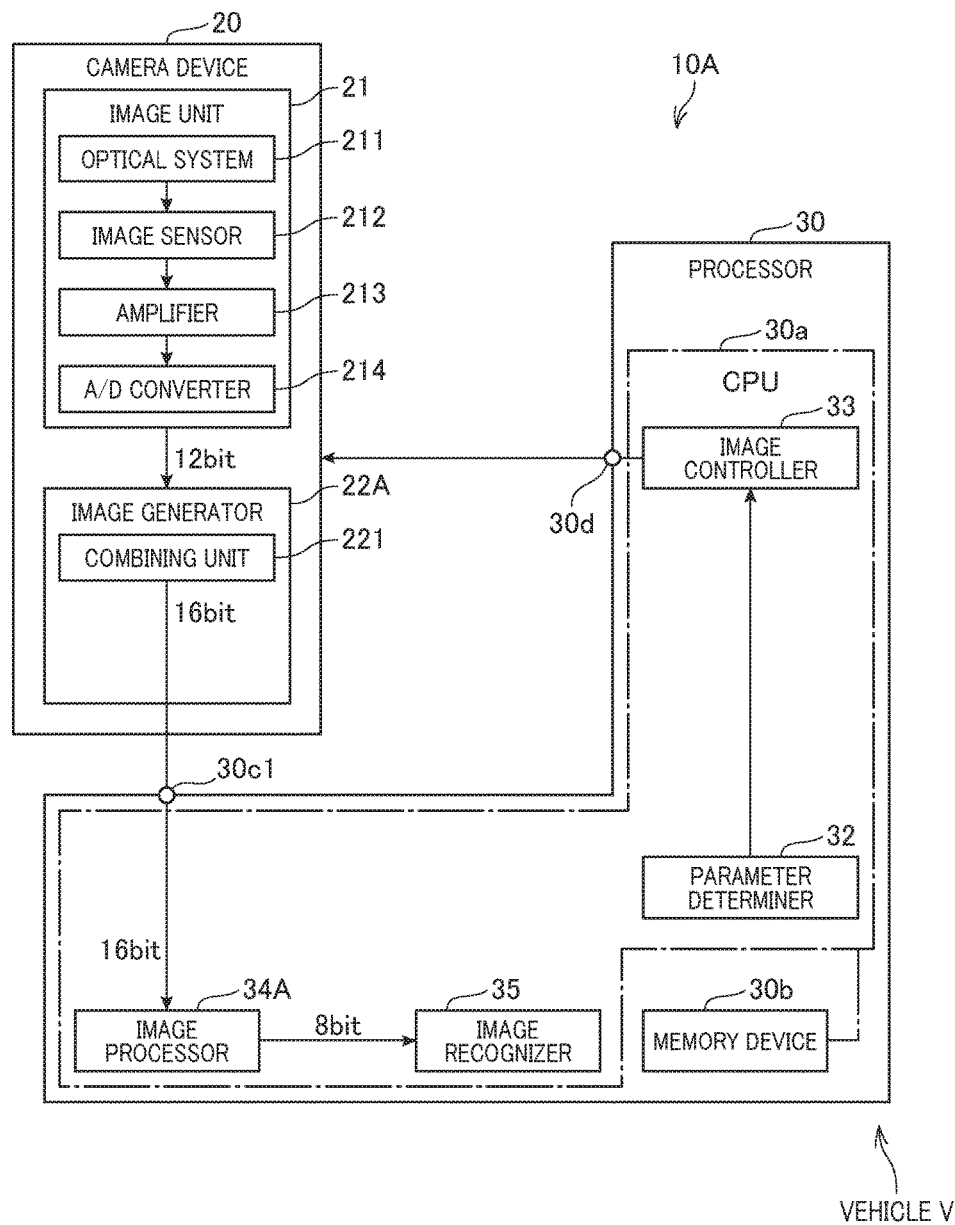
FIG. 11 is a block diagram schematically illustrating an example of the structure of an image generating apparatus according to the second embodiment of the present disclosure.
Figure 12:
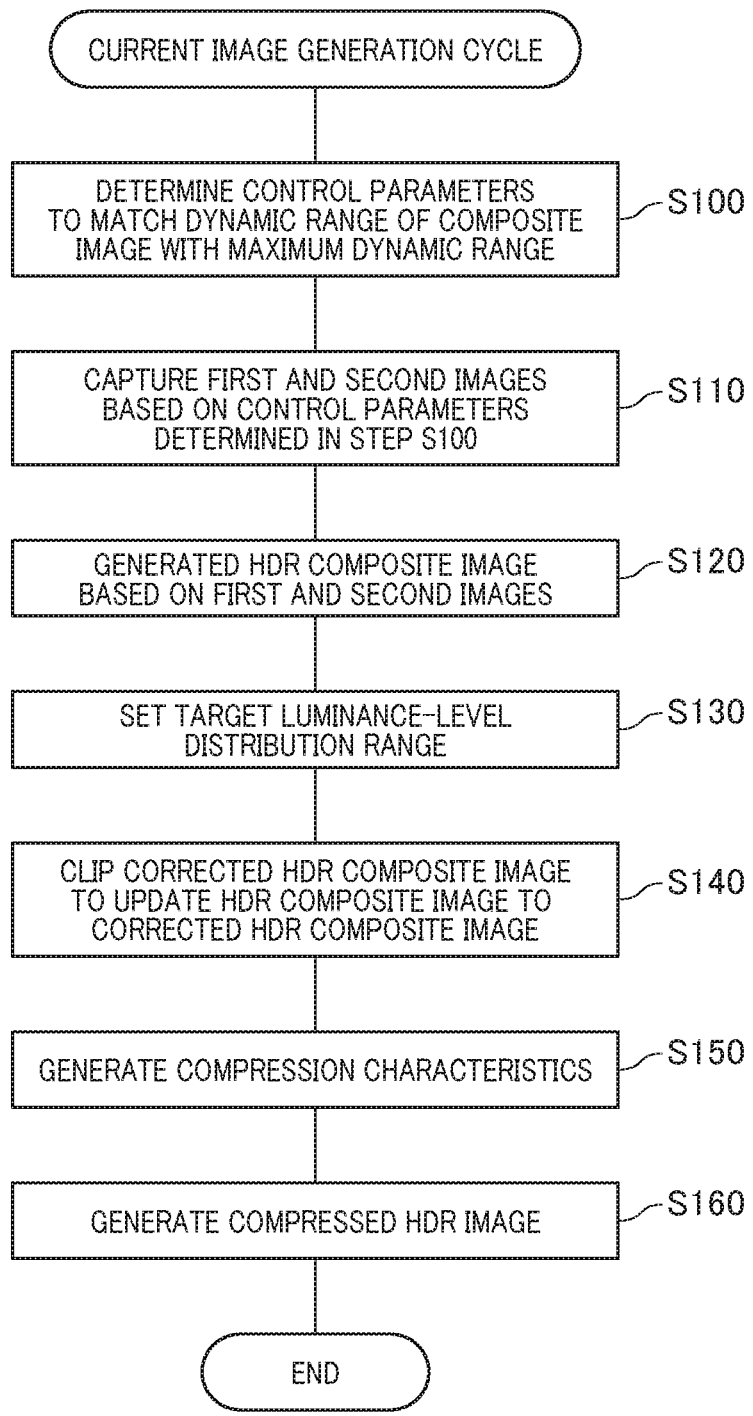
FIG. 12 is a flowchart schematically illustrating an example of an image generation cycle carried out by the image generating apparatus illustrated in FIG. 11.
Figure 13:
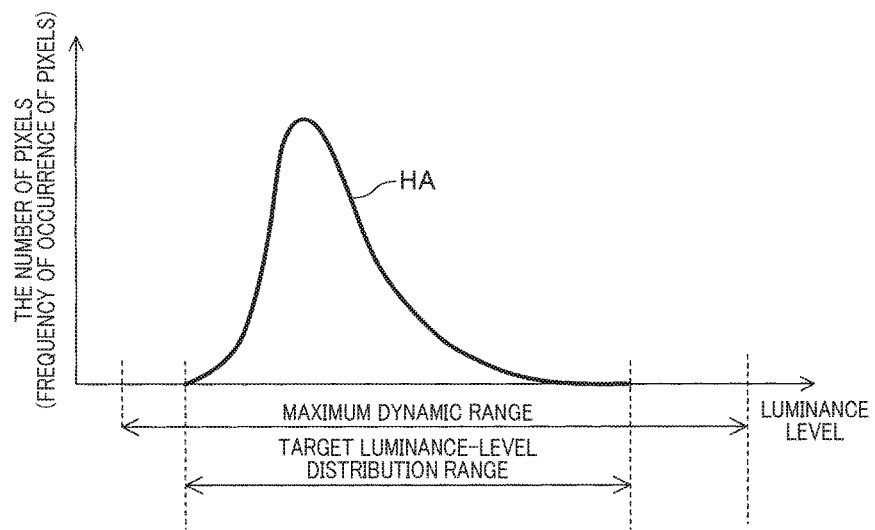
FIG. 13 is a graph schematically illustrating a relationship between a maximum dynamic range of a camera device illustrated in FIG. 1 and the target luminance-level distribution range.

The following describes the second embodiment of the present disclosure with reference to FIGS. 11 to 13.

An image generating apparatus 10A according to the second embodiment differs from the image generating apparatus 10 in the following points. So, the following mainly describes the different points of the image generating apparatus 10A according to the second embodiment, and omits or simplifies descriptions of like parts between the first and second embodiments, to which identical or like reference characters are assigned, thus eliminating redundant description.

The image generating apparatus 10 according to the first embodiment is configured to determine a value of at least one of the control parameters that control the imaging unit 21 to thereby generate an HDR composite image whose dynamic range matches with the target luminance-level distribution range within which the luminance levels of at least one recognition target included in the HDR composite image are distributed.

In contrast, the image generating apparatus 10A according to the second embodiment is configured to generate an HDR composite image whose dynamic range has a maximum width. The dynamic range having its maximum width will be referred to as a maximum dynamic range. Then, the image generating apparatus is configured to manipulate the HDR composite image to thereby clip, i.e. extract, a corrected HDR composite image whose dynamic range is adjusted to match with the target luminance-level distribution range. The maximum dynamic range of the HDR composite image is previously determined depending on the design specifications of the camera device 20, which include the sensitivity of the light-sensitive elements of the image sensor 212, and the maximum and minimum values of the shutter time ST of the camera device 20.

Specifically, as illustrated in FIG. 11, in the image generating apparatus 10A, an image generator 22A does not include the compression unit 222, so that the image generator 22A generates and outputs an HDR composite image having a digital pixel value of each pixel represented by the first bit width of 16 bits to an image processor 34A of the processor 30.

The image processor 34A of the image generating apparatus 10A serves as both the range setter 31 and the compression unit 222 according to the first embodiment, so that the range setter 31 is eliminated from the processor 30.

Additionally, the image generating apparatus 10A is configured to periodically carry out an image generation cycle, i.e. an image generation process, which is partially different from the image generation cycle illustrated in FIG. 2, with reference to FIG. 12.

In step S100 of a current image generation cycle, the parameter determiner 32 determines a value of at least one of the control parameters including the first shutter time ST1, the second shutter time ST2, and the analog gain such that the dynamic range of an HDR composite image generated based on the control parameters matches with the maximum dynamic range.

Next, in step S110, the imaging controller 33 controls the imaging unit 21 using the control parameters determined in step S100 to cause the imaging unit 21 to capture first and second images during respective first and second different shutter times ST1 and ST2, which is similar to the operation in step S10. In step S110, the imaging unit 21 also amplifies each of the first and second images by the analog gain, and converts the analog pixel signals (analog pixel values) of each of the amplified first and second images into digital pixel signals (digital pixel values) based on the predetermined bit width of 12 bits, which is similar to the operation in step S10.

Next, in step S120, the image generator 22A obtains the digitized first and second images sent from the imaging unit 21, and combines the digitized first and second images with each other to generate an HDR composite image, which is similar to the operation in step S20. The digital pixel value of each pixel of the HDR composite image generated in step S120 is expressed by the first bit width, i.e. 16-bit width, and the dynamic range of the HDR composite image generated in step S120 is set to the maximum dynamic range. The HDR composite image is sent from the image generator 22 to the image processor 34A.

Next, in step S130, the image processor 34A, which serves as, for example, the range setter to set a target luminance-level distribution range of at least one recognition target with respect to the HDR composite image generated in step S120, which is similar to the operation in step S30.

Like FIG. 6, FIG. 13 schematically illustrates a histogram HA of the luminance levels of the first image (long shutter-time image) and the second image (short shutter-time image). FIG. 13 also schematically illustrates the maximum dynamic range of the HDR composite image.

Following the operation in step S130, the image processor 34A serves as, for example, a dynamic range adjuster to clip, i.e. obtain, from the HDR composite image generated in step S120, a corrected HDR image whose dynamic range matches with the target luminance-level distribution range (see FIG. 13). Then, the image processor 34 updates the HDR composite image generated in step S120 to the corrected HDR composite image.

Next, in step S150, the image processor 34A serves as, for example, a compression unit to generate compression characteristics CC for compressing the corrected HDR composite image generated in step S140, which is similar to the operation in step S50.

Subsequently, in step S160, the image processor 34A serves as, for example, the compression unit to compress, based on the compression characteristics CC generated in step S150, the corrected HDR composite image having a digital pixel value of each pixel represented by the first bit width of 16 bits to thereby generate a compressed HDR composite image having a digital pixel value of each pixel represented by the second bit width of 12 bits in step S160.

In step S160, the image processor 34A discards lowest-order four bits from the 12-bit digital pixel value of each pixel of the compressed HDR composite image, thus outputting an output image having a 8-bit digital pixel value of each pixel to the image recognizer 35. Thereafter, the image generating apparatus 10A terminates the current image generation cycle, and thereafter returns to step S100, thus performing the next image generation cycle.

The above second embodiment of the present disclosure achieves the following sixth advantageous effect in addition to the third to fifth advantageous effects set forth above.

Specifically, the image generating apparatus 10A is configured to generate an HDR composite image whose dynamic range is set to the maximum dynamic range, and clip, from the HDR composite image, a corrected HDR composite image whose dynamic range matches with the target luminance-level distribution range. This configuration therefore reduces allocation of digital pixel values to luminance levels of the HDR composite image; the luminance levels correspond to no recognition targets in the HDR composite image. This therefore enables digital pixel values to be allocated to the luminance levels of at least one recognition target in the HDR composite image.

Third Embodiment

The following describes the third embodiment of the present disclosure.

An image generating apparatus 10B according to the third embodiment differs from the image generating apparatus 10A in the following points. So, the following mainly describes the different points of the image generating apparatus 10B according to the third embodiment, and omits or simplifies descriptions of like parts between the second and third embodiments, to which identical or like reference characters are assigned, thus eliminating redundant description.

The image generating apparatus 10A according to the second embodiment is configured such that the image processor 34A generates a corrected HDR composite image whose dynamic range is adjusted to match with the target luminance-level distribution range.

Figure 14:
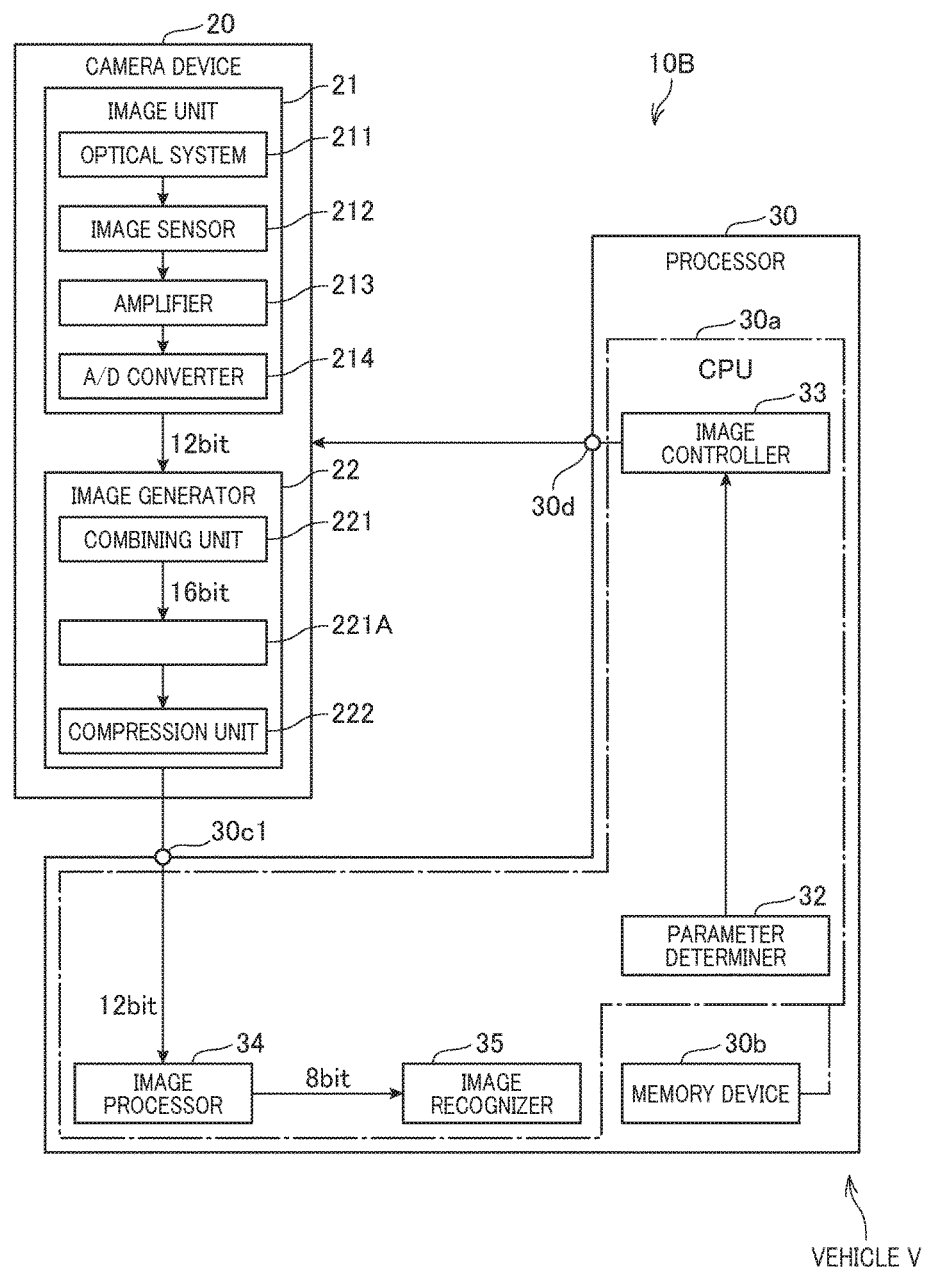
FIG. 14 is a block diagram schematically illustrating an example of the structure of an image generating apparatus according to the third embodiment of the present disclosure.

In contrast, referring to FIG. 14, the image generating apparatus 10B includes an image generator 22B in place of the image generator 22A.

Specifically, the image generator 22B, i.e. the combining unit 221, obtains the digitized first and second images sent from the imaging unit 21, and combines the digitized first and second images with each other to generate an HDR composite image (see step S120).

Next, the image generator 22B includes an image processing circuit 221A, which serves as, for example, the range setter to set a target luminance-level distribution range of at least one recognition target with respect to the HDR composite image generated in step S120 (see step S130).

The image processing circuit 221A of the generator 22B also serves as, for example, a dynamic range adjuster to clip, from the HDR composite image generated in step S120, a corrected HDR image whose dynamic range matches with the target luminance-level distribution range, thus updating the HDR composite image generated in step S120 to the corrected HDR composite image (see step S140).

Next, the image generator 22B, i.e. the compression unit 222, generates compression characteristics CC for compressing the corrected HDR composite image generated in step S140 (see step S150), and compresses, based on the compression characteristics CC generated in step S150, the corrected HDR composite image having a digital pixel value of each pixel represented by the first bit width of 16 bits to thereby generate a compressed HDR composite image having a digital pixel value of each pixel represented by the second bit width of 12 bits (see step S160).

Then, the image processor 34 discards predetermined lowest-order bits from the 12-bit digital pixel value of each pixel of the compressed HDR composite image output from the imaging unit 21. For example, the image processor 34 discards the lowest-order four bits from the 12-bit digital pixel value of each pixel of the compressed HDR composite image, thus outputting an output image having a 8-bit digital pixel value of each pixel to the image recognizer 35.

That is, the image generator 22B is programmed to perform the operations in steps S120 to S140, and the image processor 34 is programmed to perform the operations in steps S150 and S160.

The above third embodiment of the present disclosure achieves the above sixth advantageous effect in addition to the third to fifth advantageous effects set forth above.

The present disclosure is not limited to the descriptions of the first to third embodiments, and the descriptions of each of the first to third embodiments can be widely modified within the scope of the present disclosure.

In each of the first to third embodiments, the shutter time ST is set to the first shutter time ST1 and the second shutter time ST2, but the present disclosure is not limited thereto. Specifically, the shutter time ST can be set to first to third shutter times ST1 to ST3, which are arranged in descending order, and an HDR composite image can be generated based on the first to third shutter times ST1 to ST3. Additionally, the shutter time ST can be set to four or more shutter times, and an HDR composite image can be generated based on the four or more shutter times The functions of one element in each of the first to third embodiments can be distributed as plural elements, and the functions that plural elements have can be combined into one element. At least part of the structure of each of the first to third embodiments can be replaced with a known structure having the same function as the at least part of the structure of the corresponding embodiment. A part of the structure of each of the first to third embodiments can be eliminated. At least part of the structure of each of the first to third embodiments can be added to or replaced with the structures of the other embodiment. All aspects included in the technological ideas specified by the language employed by the claims constitute embodiments of the present invention.

The present disclosure can be implemented by various embodiments in addition to the image generating apparatus; the various embodiments include systems each including the image generating apparatus, programs for serving a computer as one of the image generating apparatuses, storage media storing the programs, and image generating methods.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An image generating apparatus comprising:
a controller configured to cause, based on control parameters for a camera, the camera to capture a first image based on a first shutter time and a second image based on a second shutter time for each of first and second processes in sequence, the first and second images each including at least one target to be imaged, the first shutter time being longer than the second shutter time, the control parameters including the first shutter time and the second shutter time;
an image combining unit configured to combine, for each of the first and second processes, the first image and the second image to thereby generate a composite image having a digital pixel value of each pixel thereof, the digital pixel value of each pixel representing a luminance level of the corresponding pixel by a first bit width;
a range setter configured to set, for each of the first and second processes, a target luminance-level distribution range of the at least one target with respect to the composite image, the target luminance-level distribution range representing a range within which luminance levels of the at least one target are distributed;
a compression characteristic generator configured to generate, for each of the first and second processes, a compression characteristic for compressing the digital pixel value of each pixel of the composite image by a second bit width, the second bit width being smaller than the first bit width;
a compression unit configured to compress, in accordance with the compression characteristic, the composite image for each of the first and second processes to thereby generate a compressed composite image; and
a dynamic range adjuster configured to adjust a dynamic range of the composite image generated for one of the first and second processes such that the dynamic range of the composite image generated for the corresponding one of the first and second processes matches with the target luminance-level distribution range set by the range setter for the first process.

2. The image generating apparatus according to claim 1, wherein:
the dynamic range adjuster is configured to determine, for the second process, a value of at least one of the control parameters such that the dynamic range of the composite image generated for the second process matches with the target luminance-level distribution range set by the range setter for the first process.

3. The image generating apparatus according to claim 1, wherein:
the control parameters for the current image generating process for the first process are determined such that the dynamic range of the composite image for the first process matches with a maximum dynamic range previously determined by design specifications of the camera; and
the dynamic range adjuster is configured to extract, from the composite image generated by the image combining unit for the first process, a corrected composite image whose dynamic range matches with the target luminance-level distribution range set by the range setter for the first process,
the compression unit being configured to compress, in accordance with the compression characteristic, the corrected composite image for the first process as the composite image.

4. The image generating apparatus according to claim 1, wherein:
the control parameters for the current image generating process for the first process are determined such that the dynamic range of the composite image for the first process matches with a maximum dynamic range previously determined by design specifications of the camera; and
the dynamic range adjuster is installed in the camera and is configured to clip, from the composite image generated by the image combining unit for the first process, a corrected composite image whose dynamic range matches with the target luminance-level distribution range set by the range setter for the first process.

5. The image generating apparatus according to claim 1, wherein:
the range determiner is configured to set the target luminance-level distribution range such that the number of first pixels of luminance levels of the composite image is smaller than a predetermined high-contrast threshold, the luminance levels of the first pixels being higher than a predetermined upper limit.

6. The image generating apparatus according to claim 1, wherein:
the range determiner is configured to set the target luminance-level distribution range such that the number of second pixels of luminance levels of the composite image is smaller than a predetermined low-contrast threshold, the luminance levels of the second pixels being lower than a predetermined lower limit.

7. The image generating apparatus according to claim 1, wherein:
the range determiner is configured to eliminate at least one luminance level from the luminance levels of the composite image to thereby set the target luminance-level distribution range based on the remaining luminance levels of the composite image if the at least one luminance level is higher than a predetermined upper limit threshold.

* * * * *